United States Patent [19]

Brown

[11] Patent Number: 4,514,201
[45] Date of Patent: Apr. 30, 1985

[54] AIR INTAKE ANTI-FOULING STACK

[76] Inventor: Duane G. Brown, 812 SW. Carden, Pendleton, Oreg. 97801

[21] Appl. No.: 467,768

[22] Filed: Feb. 18, 1983

[51] Int. Cl.³ .................. B01D 46/24; B01D 46/48; B60K 11/04
[52] U.S. Cl. .................. 55/385 B; 55/433; 55/480; 55/493; 180/68.1; 180/68.4
[58] Field of Search ............ 55/385 B, 433, 480, 55/493; 98/2.11, 64; 165/41, 51; 180/54 A, 68 R, 68.1, 68.4

[56] References Cited

U.S. PATENT DOCUMENTS

| 1,875,427 | 9/1932 | Donaldson | 55/480 |
| 2,123,991 | 7/1938 | Fageol . | |
| 2,242,494 | 5/1941 | Wolf . | |
| 2,285,119 | 6/1942 | Klavik . | |
| 2,455,252 | 11/1948 | Heth . | |
| 2,471,326 | 5/1949 | Hoyt, Sr. | 55/433 |
| 2,634,713 | 4/1953 | Bartch et al. . | |
| 2,710,667 | 6/1955 | King et al. | 55/433 |
| 2,730,084 | 1/1956 | Stegeman . | |
| 2,785,620 | 3/1957 | Welch . | |
| 3,043,390 | 7/1962 | Lattay . | |
| 3,494,442 | 2/1970 | Rickel et al. . | |
| 3,565,203 | 12/1968 | Ashton et al. . | |
| 3,844,202 | 10/1974 | Ferguson | 55/385 B |
| 3,938,586 | 2/1976 | Barlow et al. . | |
| 3,987,862 | 10/1976 | Lidstone . | |
| 4,157,902 | 6/1979 | Tokar . | |

FOREIGN PATENT DOCUMENTS 373185  5/1973  U.S.S.R. .................. 55/385 B

Primary Examiner—David L. Lacey
Attorney, Agent, or Firm—Kolisch, Hartwell and Dickinson

[57] ABSTRACT

An anti-fouling air intake stack for use on an agricultural combine which is equipped with a swingable rotary screen air filter basket. The air intake stack provides an elevated air intake which is of greater elevation above ground level than the normal air intake and which draws cooling air for the engine, hydraulic and air conditioning components of the combine from a height which is relatively debris-free while allowing unimpaired access to the combine engine compartment.

3 Claims, 5 Drawing Figures

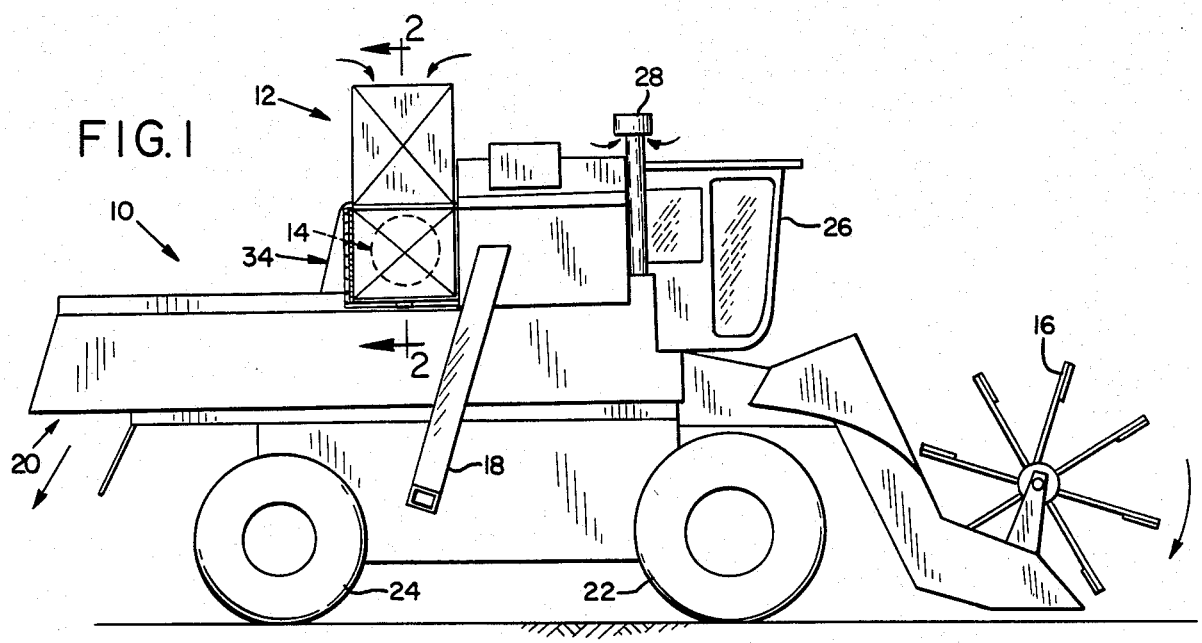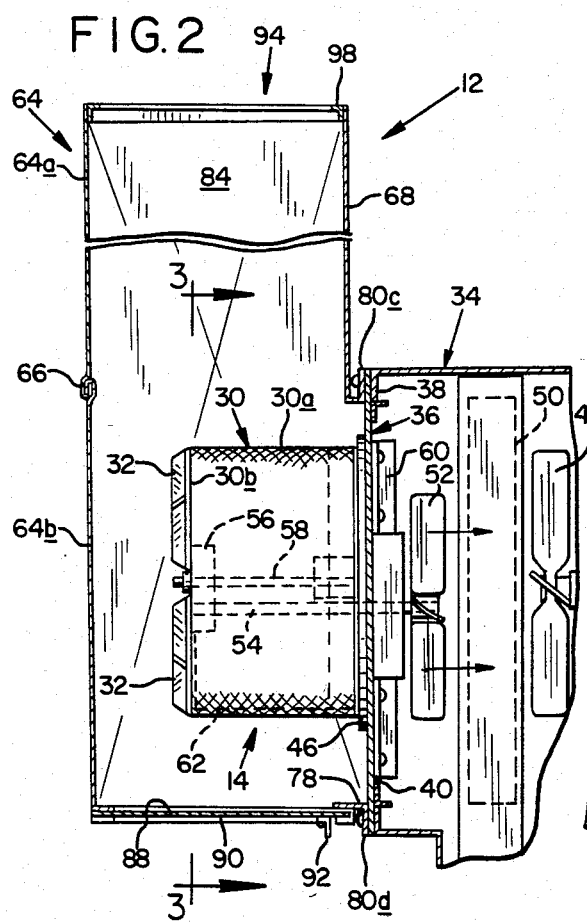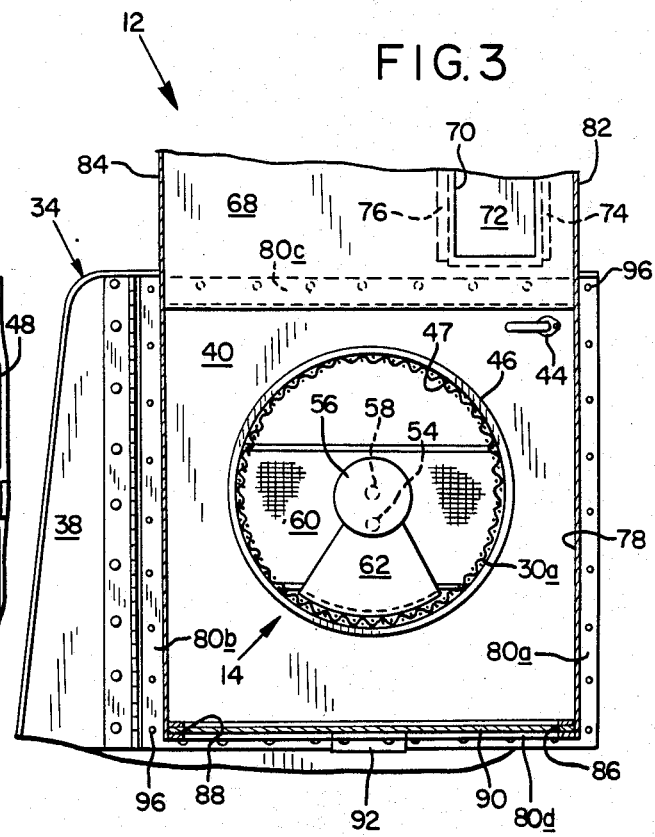

AIR INTAKE ANTI-FOULING STACK

BACKGROUND AND SUMMARY OF THE INVENTION

The present invention pertains to an air intake stack which is to be used in combination with an agricultural combine of the type employing a rotary screen air cleaner to filter air which is subsequently used to cool the internal combustion engine, hydraulic system and cab air conditioning system of the combine. Specifically, the air intake anti-fouling stack provides an elevated air intake port which is less susceptible to collecting debris-filled air.

Self-propelled agricultural combines are driven by internal combustion engines. The engine is placed in an engine housing which isolates the engine and hydraulic system from exposure to the ambient air, which frequently contains dust and chaff from the crop being harvested.

When a combine is in use, it is driven through a field of mature grain. The grain is cut by a rotary cutter on the front of the combine and then fed into the innards of the combine. Inside the combine, the grain is separated from the stocks and chaff, and is stored on board the combine, or, discharged through a grain elevator to a collecting bin, usually mounted on a truck chassis, which moves along side the combine. The chaff from the grain is ejected through a residue discharge port in the rear of the combine.

Frequently, several combines and their support vehicles operate in one field at the same time. The result is that, while the grain is rapidly harvested, the concentration of harvest debris, i.e., straw, chaff and dust, is quite high. Particularly in the case where several combines are operating, usually in a "V" or singlewing formation, the trailing units are surrounded by debris stirred up by the leading units.

Two sources of relatively clean air must be supplied to the combine. The first source must be totally free of debris and dust as it is used to mix with the fuel and provide power to the combine through its internal combustion engine. A combustion air intake fulfills this purpose and is usually of the truck-type water-filled air cleaner. It is mounted behind and above the cab, in an area where the air contains less debris than would be found closer to the ground.

The second air supply provides cooling for the engine, the hydraulic system and the cab air conditioning. The rotary screen air filter is a device which cleans cooling air and has been in use on agricultural combines for some time. The screen is generally formed as a closed cylinder, like a cake, and mounted vertically on the side of the combine. Enclosed within the screen or within the engine housing adjacent the screen is an impeller blade or fan which is driven off the airflow caused by an engine-driven cooling fan. A wedge-shaped portion of the screen is internally baffled to prevent airflow through the screen at that particular portion, which is generally located at the bottom of the screen. In operation, the engine driven fan draws air through the screen in all unbaffled portions. Dust and chaff collect on the screen over most of its surface, and drop off of the screen when the portion of the screen to which it is adhering rotates adjacent the internal baffle. The effects of gravity and the lack of lower internal pressure at the location of the baffle combine to allow any particulate matter to drop off of the screen.

While the rotary screen is a definite improvement over a static air filter device, in operation, chaff and dust particles frequently stick to the screen with sufficient adhesion to prevent the forces of gravity from removing the particles once a lower pressure area internal the screen is effected. If the screen becomes sufficiently clogged, airflow into the engine compartment is restricted, the engine and hydraulic system will begin to overheat, potentially damaging the mechanical structures which must be kept cool. The combine operator must stop the combine and manually clean the screen to prevent damage to the combine. The operator must also raise the engine compartment hood and blow chaff and dirt, which has passed through the rotary screen, from the engine radiator and from the hydraulic and air conditioning cooling coils. These stops are both costly and inefficient and can largely be eliminated through the use of the device proposed in this application.

The instant device is an anti-fouling air intake stack which completely surrounds the rotary screen air intake and draws air through the top of the stack, which is located four to five feet above the rotary screen. By drawing air into the combine engine through this anti-fouling stack, the combine operator is relieved of the frequent manual task of cleaning the rotary screen.

The primary object of the invention then, is to raise the location of the cooling air intake on an agricultural combine to a height above the ground that does not contain as much foreign particulate matter as would a lower elevation.

A secondary object of the invention is to provide an air intake which will allow a combine operator to operate the combine for longer periods of time between having to manually clean a rotary screen air intake or the cooling radiator and coils within the engine compartment.

These and other advantages and objectives of the present invention will become more fully apparent as the description which follows is read in conjunction with the accompanying drawings.

DESCRIPTION OF THE DRAWINGS

FIG. 1 is a self-propelled agricultural combine with the anti-fouling air intake stack according to the present invention in place.

FIG. 2 is a fragmentary cut-away side view of the anti-fouling stack installed on the combine.

FIG. 3 is a front elevation view of a rotary screen air filter, with the front panel of the anti-fouling stack and screen disc cut-away.

DETAILED DESCRIPTION OF THE PREFERRED EMBODIMENT

Figure 4:
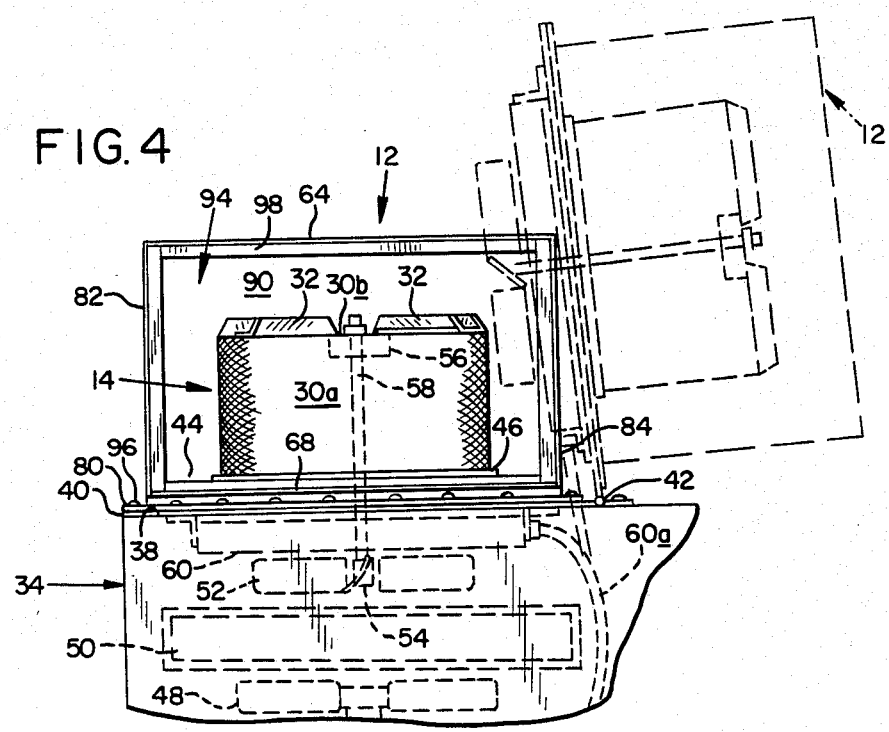
FIG. 4 is a top view of the anti-fouling stack installed on the combine.
Figure 5:
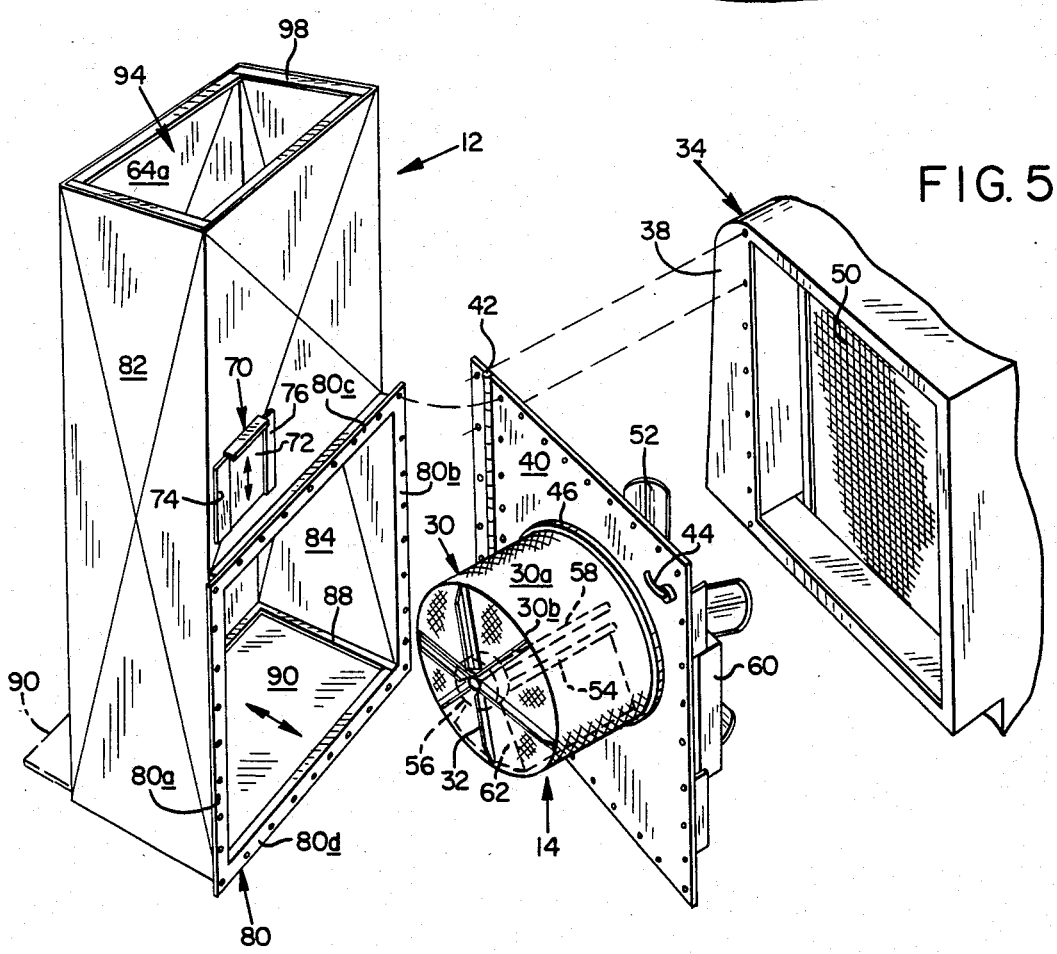
FIG. 5 is an exploded perspective view of the anti-fouling stack, rotary screen air filter, and combine air intake.

Beginning with FIG. 1, a self-propelled agricultural combine is shown generally at 10. The particular combine to which the preferred embodiment of an anti-fouling air-intake stack 12 pertains is an Allis Chalmers Gleaner MH2 combine. The anti-fouling stack is, however, adaptable and useful with any agricultural combine which includes a rotary screen air filter 14 of the type disclosed in U.S. Pat. No. 3,475,883, whether or not modified as in U.S. Pat. No. 3,938,586.

Combine 10 includes a rotary cutter 16, a grain elevator 18 and a residue discharge port 20. Combine 10 moves by means of a pair of driving wheels 22 and maneuvers by means of a pair of rear steering wheels 24. The operator of combine 10 sits in a cab 26, which is generally air conditioned. A combustion air intake 28 is located to the rear of cab 26.

With the readers attention directed to FIGS. 2 and 3, rotary screen air filter 14, consists of a cake-shaped basket 30, which is comprised of a circular side wall 30a and a disc-shaped screen 30b. Both components of the air filter are made from fine mesh metal screen. Disc portion 30b is made rigid by a set of reinforcement bars 32.

Combine 10 is powered by an internal combustion engine, which is completely enclosed by an engine housing 34. Cooling air may enter engine housing 34 only through an aperture 36 provided in a vertical portion 38 of engine housing 34. Basket 30 is mounted on a door 40 which is attached to vertical portion 38 by a hinge 42. Door 40 completely covers aperature 36. The door is locked or unlocked by means of a latch handle 44. Door 40 also includes a circular basket receiver 46 which holds the open end of basket 30 in position about a circular port 47 in door 40.

Referring specifically now to FIG. 2, an engine-driven fan is shown at 48. This fan operates whenever the combine engine is running. A cooling radiator 50 provides cooling means for engine and hydraulic fluids. Engine fan 48 draws air through cooling basket 30, port 47, aperature 36 and radiator 50. In doing so, the airstream generated by fan 48 causes a basket impeller 52 to rotate, and drive an impeller shaft 54. Impeller shaft 54 is connected to a gear box 56 which drives a basket shaft 58, thereby causing basket 30 to rotate about basket shaft 58 within basket receiver 46. An air conditioning condensing coil 60, which includes an inflow tube 60a and outflow tube (not shown) (FIG. 4), is usually mounted on the backside of door 40 and is also cooled by the airflow passing through screen 30 into engine housing 34. Coil 60 and its associated framework also provide mounting and journaling means for shafts 54 and 58.

When basket 30 is mounted in its normal location, on the vertical portion 38 of engine housing 34, air is drawn through the basket over approximately 5/6 of its exterior surface. A wedge-shaped baffle means 62 is located adjacent the bottom region of screen 30a and extends towards the center of disc 30b in a wedge shape. Baffle 62 blocks approximately 1/6 of the mesh portion of basket 30. Since baffle 62 is located in the bottom portion of basket 30, any debris which adheres to a specific point on the exterior of the basket mesh will drop off of the basket under the influence of gravity when the point in question comes adjacent the baffle.

While this concept works much better than does a static filtering device, the location of the cooling air intake on most combines, and on the Gleaner MH2 model combines in particular, is such that the rotary basket is in a location which is frequently full of debris from the harvesting process. After a few hours of use, the combine must be stopped and the basket must be manually cleaned, as some particles adhere to the mesh with such force that the effect of gravity is insufficient to remove debris from the exterior surface of the basket.

It has been proven that elevating the level of air intake for engine cooling air to a higher elevation above the surface of the field being harvested significantly reduces the need to manually clean a rotary basket air filter. Anti-fouling air intake stack 12 so elevates the level of air intake from engine cooling vertically above the normal location of air filter 14.

The stack is an elongate, rectangular single chambered box-like structure, open at one end, which is constructed from sheet metal. Stack 12 has four vertical walls which include a front wall 64 which is comprised of a top panel 64a and a bottom panel 64b which are connected by a conventional S-join 66. A rear panel 68 includes an access port 70 which is closed by means of a slidable access port door 72 and which slides in latch access door tracks 74, 76. The purpose for port 70 and door 72 will be explained later.

The lower rear side of stack 12 is of a size and shape to substantially conform with door 40. The lower rear side contains an opening 78 which is surrounded by a stack mounting lip 80. Lip 80 includes side lips 80a, 80b, a top lip 80c and a bottom lip 80d. Front wall 64 is separated from rear wall 68 and rear opening 78 by means of a pair of spaced-apart vertical side walls 82, 84. Opening 78 and the vertical walls are sized such that air filter 14 may be entirely and unobstructedly received within the internal portion of stack 12. In the preferred embodiment, all of the sheet metal walls are stressed to provide rigidity and additional strength to the stack.

The bottom margin of side walls 82 and 84 are formed into channels 86, 88 which receive a sliding bottom piece 90. Bottom piece 90 may be slid within channels 86, 88 by means of a handle grip 92, between a closed position, and a position where the bottom of the stack 12 is at least partially open. Stack 12 includes top opening 94 which allows air to enter the stack and subsequently flow through basket 30 and into engine housing 34. Stack 12 is attached to door 40 by means of a set of nut and bolt fasteners 96 which pass through lip 80 and door 40. All of the vertical side wall extend upward from the bottom of stack 12. An internal frame 98 surrounds the top opening.

The location of the air intake for engine housing 34 has thus been elevated by several feet above the rotary screen air filter. As a result, the air which ultimately reaches the engine compartment does not contain as much harvest debris as it would had the air been drawn in from a lower elevation. Although the air contains substantially less debris when drawn in from the higher elevation, there is still some debris in the air which will collect on the outside of screen 30 and will drop off as the basket rotates past baffle 62. Stack 12 may be quickly cleaned of this debris by manually sliding bottom piece 90 within channels 86, 88, thereby allowing debris which has settled on the top surface of bottom piece 90 to drop out of stack 12 and onto the ground.

As previously mentioned, door 40 is connected with vertical portion 38 by means of hinge 42. This arrangement allows the door to be opened and allows entry to the interior of engine housing 34. Since door 40 is completely covered by stack 12, latch handle 44 would be inaccessible were it not for the presence of access port 70 in rear panel 68 of stack 12. Stack 12 is configured so that it may be swung with door 40 once the door, and its appurtenant rotary basket and stack are released by means of handle 44.

Thus, a new anti-fouling air intake stack has been disclosed which allows an agricultural combine to operate in a debris-filled environment with a minimum of operator attention to its cooling air cleaning mechanism. Although the rotary basket and cooling radiator and coils still require some attention, the amount of time spent by the operator is greatly reduced and the possibility of damage to the motive and hydraulic components of the combine through overheating thereby reduced. The advantage of this device over prior art is that the present invention completely surrounds the rotary basket assembly and pivots with the assembly allowing the operator access to the engine housing without removing the air intake stack while also allowing access to the rotary basket for cleaning and removal of debris.

While a preferred embodiment of the invention has been described, it is appreciated that variations and modifications may be made without departing from the spirit of the invention. It is also foreseeable that variations of the invention may be made to adapt it to use on other makes and models of agricultural combines which utilize a rotary screen as an air intake filter.

It is claimed and desired to secure by Letters Patent:

1. An anti-fouling, air intake stack for use on a combine having an engine, a housing enclosing the engine including a vertical portion having an aperture through which air travels for cooling the engine, and a rotary screen air-filtering basket mounted on the vertical portion and extending outwardly around the periphery of the aperture, said stack comprising:
   a vertical, single-chambered box having an open top, and an open bottom, said box including a member positioned and arranged to be selectively movable between a first position closing said bottom and a second position in which the bottom is at least partially open, and vertical sides attached to and extending from the bottom,
   including one side with an opening disposed adjacent said bottom and sized to allow passage of the basket freely therethrough, said one side being fixedly mountable on the vertical portion so as to allow the basket to extend through the side opening,
   said box being sized to receive internally, entirely and unobstructedly the basket when said one side is mounted on the vertical portion.

2. The stack of claim 1, wherein said member is positioned and arranged to be slidably movable between said first and said second positions.

3. A single-chambered, anti-fouling air intake stack for use on a combine having an engine, a housing enclosing the engine including a vertical portion having an aperture through which air travels for cooling the engine, and a rotary screen air-filtering basket mounted on the vertical portion and extending outwardly around the aperture periphery, said stack comprising
   an open bottom and a member positioned and arranged to be selectively slidable between a first position closing the bottom and a second position in which the bottom is at least partially open, and
   vertical wall means joined to said bottom and having an opening sized to allow passage of such a basket therethrough, mountable on the vertical portion so as to allow the basket to extend through said opening, said walls forming at their top an air inlet disposed substantially vertically so as to be above such basket when operatively received within said intake,
   said walls and bottom being constructed to receive internally, entirely and unobstructedly the basket when said wall means is operatively mounted on the vertical portion.

* * * * *